United States Patent [19]
Fujioka et al.

[11] Patent Number: 5,635,117
[45] Date of Patent: Jun. 3, 1997

[54] INJECTION MOLDING TECHNIQUE FOR PLURAL CAVITY PRODUCTS

[75] Inventors: Yoshikazu Fujioka, Hiroshima-ken; Nobutaka Tanaka, Hiroshima; Yasuyuki Kan, Hiroshima-ken, all of Japan

[73] Assignee: Mazda Motor Corporation, Hiroshima-ken, Japan

[21] Appl. No.: 188,608

[22] Filed: Jan. 31, 1994

[30] Foreign Application Priority Data

Jan. 30, 1993 [JP] Japan ................. 5-034893

[51] Int. Cl.⁶ ................................ B29C 45/76
[52] U.S. Cl. .............. 264/40.1; 264/572; 425/130; 425/136; 425/143
[58] Field of Search ................ 264/40.1, 40.6, 264/572, 40.3, 513; 425/130, 143, 136

[56] References Cited

U.S. PATENT DOCUMENTS

| | | | |
|---|---|---|---|
| 4,798,692 | 1/1989 | Blersch et al. | 264/40.6 |
| 4,923,666 | 5/1990 | Yamazaki | 264/572 |
| 5,044,924 | 9/1991 | Loren | 264/572 |
| 5,096,655 | 3/1992 | Baxi et al. | 264/572 |
| 5,127,814 | 7/1992 | Johnson et al. | 264/572 |
| 5,169,648 | 12/1992 | Eckardt et al. | 264/572 |
| 5,174,932 | 12/1992 | Johnson et al. | 264/572 |
| 5,198,177 | 3/1993 | Sugiyama et al. | 264/572 |
| 5,256,047 | 10/1993 | Moldovanyi | 264/572 |
| 5,282,730 | 2/1994 | Daniels et al. | 264/572 |
| 5,295,800 | 3/1994 | Nelson et al. | 264/572 |

FOREIGN PATENT DOCUMENTS

| | | | |
|---|---|---|---|
| 48-41264 | 12/1973 | Japan . | |
| 56-56832 | 5/1981 | Japan | 264/572 |
| 57-14968 | 3/1982 | Japan . | |
| 62-204915 | 9/1987 | Japan | 264/40.6 |

*Primary Examiner*—Catherine Timm
*Attorney, Agent, or Firm*—Keck, Mahin & Cate

[57] ABSTRACT

An injection molded product including a plurality of internal cavities is produced by, after having injected a molten resin material into the molding cavity, injecting an inert gas with a gas pressure gradually increasing into the resin material through gas injection nozzles, which are in contact with the resin material to form the respective internal cavities inside the molten resin material. After removing the gas injection nozzles from the resin material for discharging of the inert gas directly from the resin material, any one of the gas injection nozzles, whose temperature during injection of the inert gas was lower than a predetermined temperature level, is judged to be clogged and the gas injection nozzle is cleaned by being blown out with high pressure gas.

10 Claims, 3 Drawing Sheets

INJECTION MOLDING TECHNIQUE FOR PLURAL CAVITY PRODUCTS

BACKGROUND OF THE INVENTION

This invention relates to a method of injection molding and an injection molding apparatus, and, in particular, to an injection molding method for hollow molded products and an apparatus therefor in which a highly pressurized gas is injected into a molten thermoplastic resin so as to form a cavity or cavities in the product.

DESCRIPTION OF RELATED ART

Typically, in thermoplastic resin injection molding, a molten resin is filled into a metal mold held at a low temperature with a predetermined injection pressure and then cooled and cured. When a thick-walled hollow product having an increased weight is molded, it forms small cavities or foams, which lead to a decrease in structural rigidity or strength, and surface sink marks due to local internal contraction while being cooled. In order to eliminate these defects produced in hollow molded products, a highly pressurized gas, such as nitrogen gas, is injected into the molten resin filling the metal mold so as to form a hollow product in the form of an integral piece having a high structural rigidity. Such a hollow molded product can be configured with thin and light-weight walls and, consequently, is prevented from producing surface shrinkages.

There are two ways to inject a pressurized gas into a molten resin, one of which has two pouring gates through which a molten resin and a pressurized gas are separately injected into the mold, as described in, for instance, Japanese Patent Publication No. 48-41264, and the other of which has a single pouring gate through which both molten resin and pressurized gas are injected into the mold, as described in, for instance, Japanese Patent Publication No. 57-14968. To form stable aspects and sizes of cavities or spaces in hollow molding products, it is essential to control the amount of molten resin to be injected, the pressure of gas to be injected and the gas injection timing.

However, products molded in such an injection molding method, sometimes include cavities which are improper in size and/or shape. For example, if a cavity in the molded product is smaller than specified, shrinkages occur in the hollow product due to an excess amount of molten material. On the other hand, if a cavity in the molded product is larger than specified, the thickness of the hollow product is locally insufficient, leading to an insufficient strength of the hollow product. These hollow products can be visually examined, but one cannot see from its external appearance if there are defects.

Determination of internal defects of molded products has conventionally been made by weighing the molded products, by monitoring the pressure of gas injected into a molding cavity during molding, or the like. These determinations may be effective only for hollow products having a single continuous cavity. Such determinations, however, are unacceptable for hollow products having a plurality of independent cavities. In a case in which independent cavities are formed by injecting high pressure gas into the molding cavity simultaneously through a plurality of gas injection ports, if the gas is not injected simultaneously through all of the injection ports, some of the intended cavities are not formed as specified. For example, if the gas is injected through only one of several injection ports, the volume of the cavity, which is formed by the injection of gas through the one injection port, is as large as the volumetric sum of cavities which are not formed due to the lack of gas injection. Because this results in no change in the overall weight of the product or no change in the pressure of gas at which the gas is injected to form the cavities, weighing of the molded products or monitoring of the pressure of injection gas will fail to reveal the resulting internal defects of the injection molded product formed.

SUMMARY OF THE INVENTION

It is an object of the present invention to provide an injection molding method for producing a hollow product having a plurality of independent internal cavities and an apparatus therefor which enables the determination with a high degree of certainty of the development of internal cavities during molding.

The above object and other objects of the present invention are accomplished by providing a novel injection molding method for producing a molded product having a plurality of internal cavities. At first, a molten resin material is injected into a molding cavity. After having injected a molten resin material into the molding cavity, an inert gas is injected with a gas pressure gradually increasing into the resin material through a plurality of gas injection nozzles, each of which has been in contact with the resin material, so as to form each internal cavity inside the molten resin material. Then, after the lapse of a period of time, which is predetermined for cooling and curing the resin material, each gas injection nozzle is removed from the resin material so as to discharge the inert gas directly from the resin material. During the injection of the inert gas, in particular, at a peak pressure level of the gas pressure, the temperature of the gas injection nozzle is detected. When the temperature of the gas injection nozzle is lower than a first predetermined temperature level, it is judged that a molded product is properly produced with a quality as previously specified.

Further, the gas injection nozzle is displaced into a location in the path of flow of the discharging inert gas after the removal from the resin material. In this manner, the discharging inert gas blows over the displaced nozzle and simultaneously the temperature of the gas injection nozzle is detected. When both the detected temperatures of the gas injection nozzle are between the first predetermined temperature level and another second predetermined temperature level lower than the first predetermined temperature level, a judgment is made that a molded product is properly produced with a quality as previously specified.

If it is judged or decided that a mold product is not properly produced because the detected temperatures of the nozzle are not within the specified limits, then, a pressurized gas is supplied to the gas injection nozzle after it has been removed from the resin material so as to clean it. Thereafter, the gas injection nozzle is brought into contact with the resin material and, through the gas injection nozzle, an inert gas is injected again into the resin material so as to form the internal cavity.

BRIEF DESCRIPTION OF THE DRAWINGS

The above and other objects of the present invention will be clearly understood from the following description directed to a preferred embodiment thereof when considered in conjunction with the accompanying drawings, in which.

DETAILED DESCRIPTION OF THE PREFERRED EMBODIMENT

Figure 1:
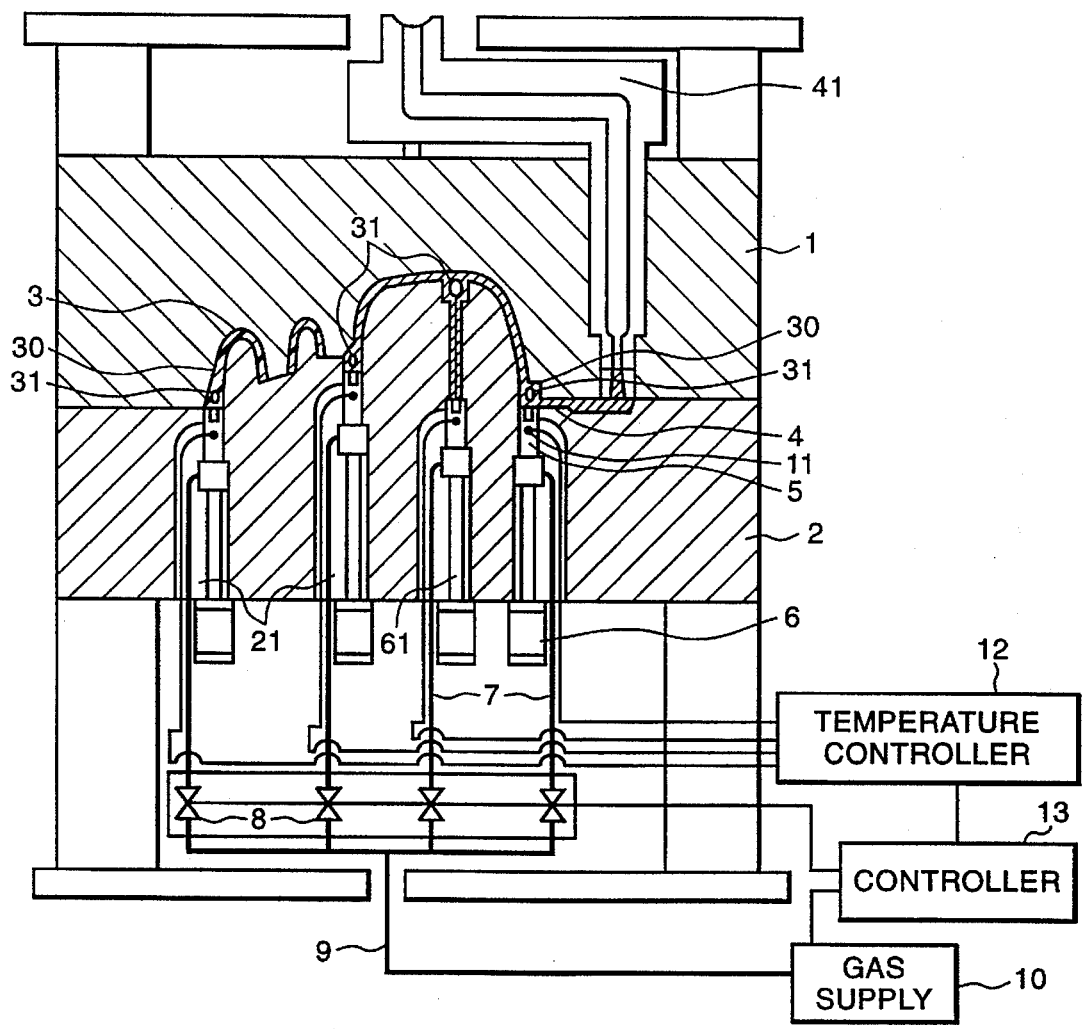
FIG. 1 is a cross-sectional view of an injection molding apparatus in accordance with a preferred embodiment of the present invention.
Figure 3:
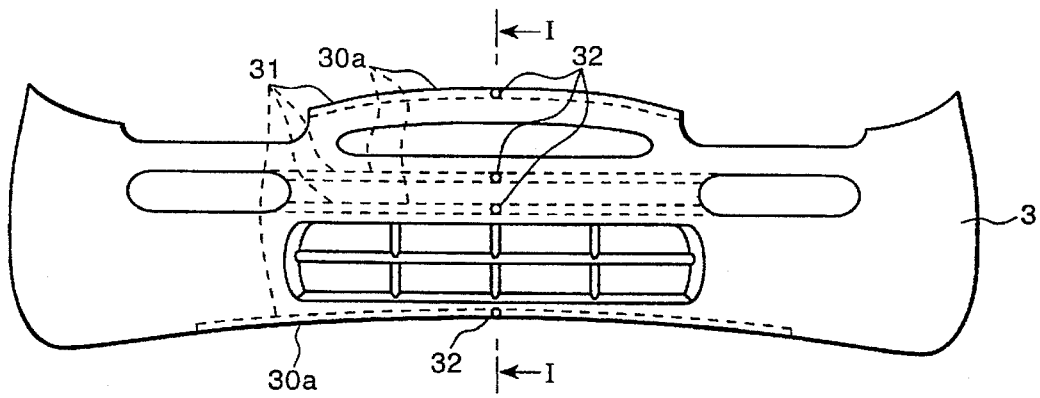
FIG. 3 is a front view showing, by example, a vehicle bumper which is molded by the injection molding apparatus of FIG. 1.

Referring to the drawings in detail and, in particular, to FIG. 1, an injection molding apparatus is shown in accordance with a preferred embodiment of the present invention. The apparatus, by way of example, is structured for an application of producing thermoplastic resin bumpers of vehicles. In this instance, as shown in detail in FIG. 3, a thermoplastic resin vehicle bumper 30 is configured to have a plurality of, for instance four in this example, thick-walled elongated portions 30a extending lengthwise of the bumper 30 or in the transverse direction of a vehicle body. Each thick-walled elongated portion 30a is formed with an elongated closed space or cavity 31 therein. The vehicle bumper 30 is formed with a central gas injection port 32 in communication with each cavity 31 in the middle thereof.

The novel injection molding apparatus has an upper stationary metal mold 1 and a lower movable metal mold 2. When the upper and lower metal molds 1 and 2 are put together, there is provided a closed molding cavity 3, having a shape coincident with the external shape of the vehicle bumper 30, between upper and lower molding surfaces. The lower metal mold 2 is provided with a pouring gate 4 through which a molten thermoplastic resin is injected directly into the molding cavity 3. The molten thermoplastic resin is introduced and injected into the molding cavity 3 from a hot runner 41, formed vertically in the upper metal mold, which communicates with the pouring gate 4.

Lower metal mold 2, which is movable, is formed with four vertically extending nozzle chambers 21 which are located corresponding to locations where the respective gas injection ports 32 of the vehicle bumper 30 lie in the molding cavity 3. Gas injection nozzles 5, each supported at the top end of a support rod 61 extending vertically in each nozzle chamber 21, is reciprocated vertically in the nozzle chamber 21 by means of a hydraulic piston-cylinder assembly 6. These gas injection nozzles 5 are connected separately to gas pipes 7, each of which is provided with a valve 8 and is in communication with a main gas pipe 9 extending from a gas supply injection unit 10.

Figure 2:
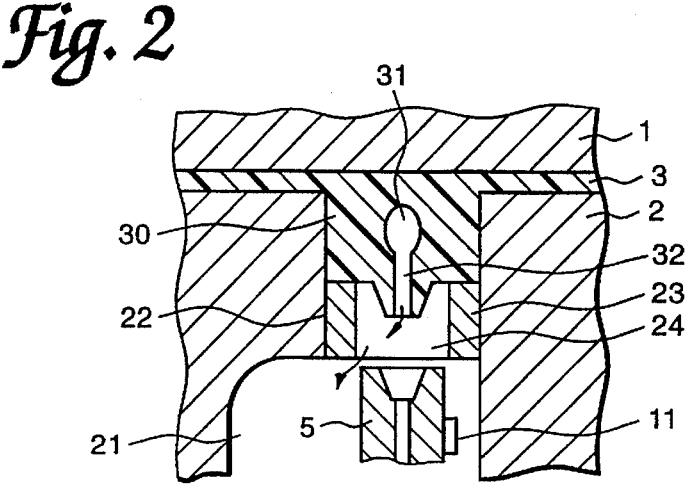
FIG. 2 is an enlarged detail view of an essential part of the injection molding apparatus of FIG. 1.

Referring to FIG. 2, the nozzle chamber 21 has a top opening 22. There is fitted in the opening 22 an annular cylindrical heat insulating ring 23. The gas injection nozzle 5, when reciprocated vertically upward, is fitted into the opening 24 of the annular heat insulating ring 23 during injection molding and is displaced vertically downward out of the opening 24 after injection molding to the position shown in FIG. 2 where it lies spaced slightly below ring 23.

Each gas injection nozzle 5 is provided with a temperature sensor 11, such as a thermocouple, for detecting nozzle temperature, and more specifically, the temperature of the tip end of the gas injection nozzle 5. This detection results in a signal representative of the nozzle temperature which signal is sent to a controller or control unit 13 via a temperature converter 12. According to the nozzle temperature, the controller 13 controls, on one hand, opening and closing of the valve peculiar to or associated with the gas injection nozzle 5 and, on the other hand, the gas supply injection unit 10 so as to regulate the pressure of gas supplied into the main gas pipe 9.

Before injection molding is commenced, the lower metal mold 2 is moved up and brought into close contact with the upper metal mold 1 so as to close the mold halves together and to form the molding cavity 3 therebetween. At this time, the gas injection nozzles 5, which have been heated up to a predetermined temperature, for instance, approximately about 200 degrees centigrade, are moved up and fitted into the heat insulating rings 23 of the nozzle chambers 21, respectively, so that the top faces of nozzles 5 and rings 23 are flush. Then, a molten resin material is poured and injected into the molding cavity 3 through the hot runner 41 and via the injection gate 4. While pouring and injecting the molten resin material into the molding cavity 3, both upper and lower metal molds 1 and 2 are cold and remain at a temperature in the range of approximately from about 40 to about 50 degrees centigrade. Thereafter, the gas injection unit 10 supplies an inert gas, such as a nitrogen gas, to the respective gas injection nozzles 5 through the separate gas pipes 7 via the main gas pipe 9. The inert gas under pressure is injected into the molten resin material in the molding cavity 3 to form cavities 31.

Figure 4:
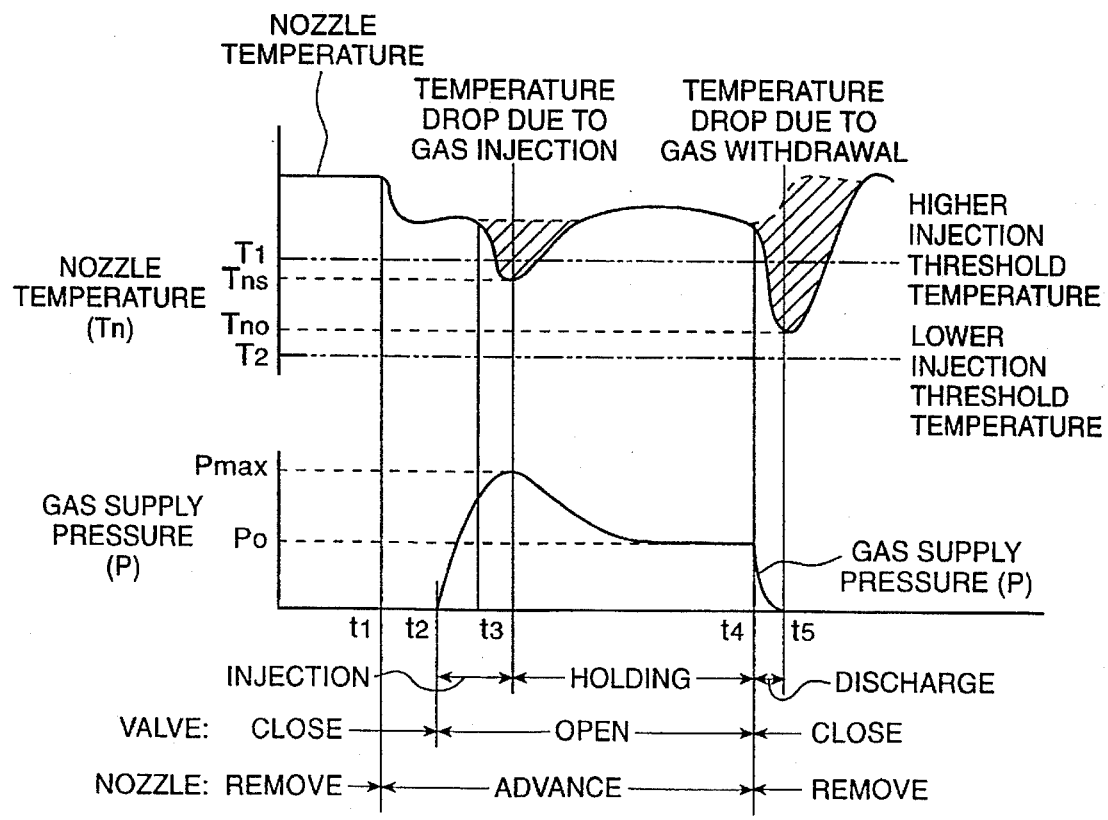
FIG. 4 is a time chart showing the relation between gas pressure and nozzle temperature.

As indicated on the time chart shown in FIG. 4, at time t1 the gas injection nozzle 5 has been fitted into the heat insulating ring 23. At this time, the temperature (Tn) of the gas injection nozzle 5 starts to drop somewhat down. Then, simultaneously with starting of the injection of the inert gas into the molten resin material in the molding cavity 3 at time t2, the gas supply control unit 10 forces the inert gas to increase its injection pressure (P), increasing the speed of the inert gas flow in the injection gas nozzle 5. As a result, the gas injection nozzle 5 is cooled and drops its nozzle temperature Tn rapidly to a lowest temperature Tns (which is hereafter referred to as the lowest injection temperature) until the injection pressure P reaches the maximum injection pressure Pmax at a time t3. When the lowest injection temperature Tns equals or is below a predetermined higher injection threshold temperature T1, it is judged that the pressurized inert gas has been injected into the molten resin material by a sufficient and proper amount.

The gas supply control unit 10 subsequently drops the injection pressure P down to a predetermined curing pressure Po from the maximum injection pressure Pmax and holds it at the curing pressure Po for a predetermined period of time, for instance approximately 20 seconds. In the period from the start (t3) of dropping of the injection pressure Po to the end (t4) of the curing time period under the curing pressure Po, the pressurized inert gas generates the cavities 31 within the molten resin material and presses the molten resin material against the interior surfaces of the upper and lower metal molds 1 and 2 until the resin material is cooled and cured to have a sufficient solidity for the retention of molded configuration. At the beginning of the curing time period, since the flow of inert gas is suspended, the nozzle temperature Tn rises approximately to the temperature it experienced or had before the inert gas injection.

At the end of the curing time period, namely time t4, the controller 10 closes each valve 8 and causes the hydraulic cylinders 6 to remove or retract the gas injection nozzles 5 out of the openings 24 of the heat insulating rings 23 of the nozzle chambers 21 (see FIG. 2). As a result, the gas in the cavities 31 is withdrawn or expelled into the nozzle chambers 21 and cools the tip end of the gas injection nozzles 5, decreasing the nozzle temperature Tn of the gas injection nozzle 5 to a temperature Tno (which is hereafter referred to as the lowest withdrawal temperature) by time t5 when the gas in the cavities 31 is fully withdrawn or expelled. When the lowest withdrawal temperature Tno falls below the higher injection threshold temperature T1, it is judged that the molding has been accomplished under a sufficiently high gas pressure. However, if the lowest withdrawal temperature Tno does not fall below the higher injection threshold temperature T1 as shown in FIG. 4, it is judged that the molding has been accomplished under an insufficient gas pressure and, hence, the molded product is defective or inferior. This Judgement is conducted by monitoring of the nozzle temperature. If the lowest withdrawal temperature Tno of any one of the gas injection nozzles 5 does not fall below the higher injection threshold temperature T1, then it is judged that the molded product is defective at this stage of gas withdrawal.

Figure 5:
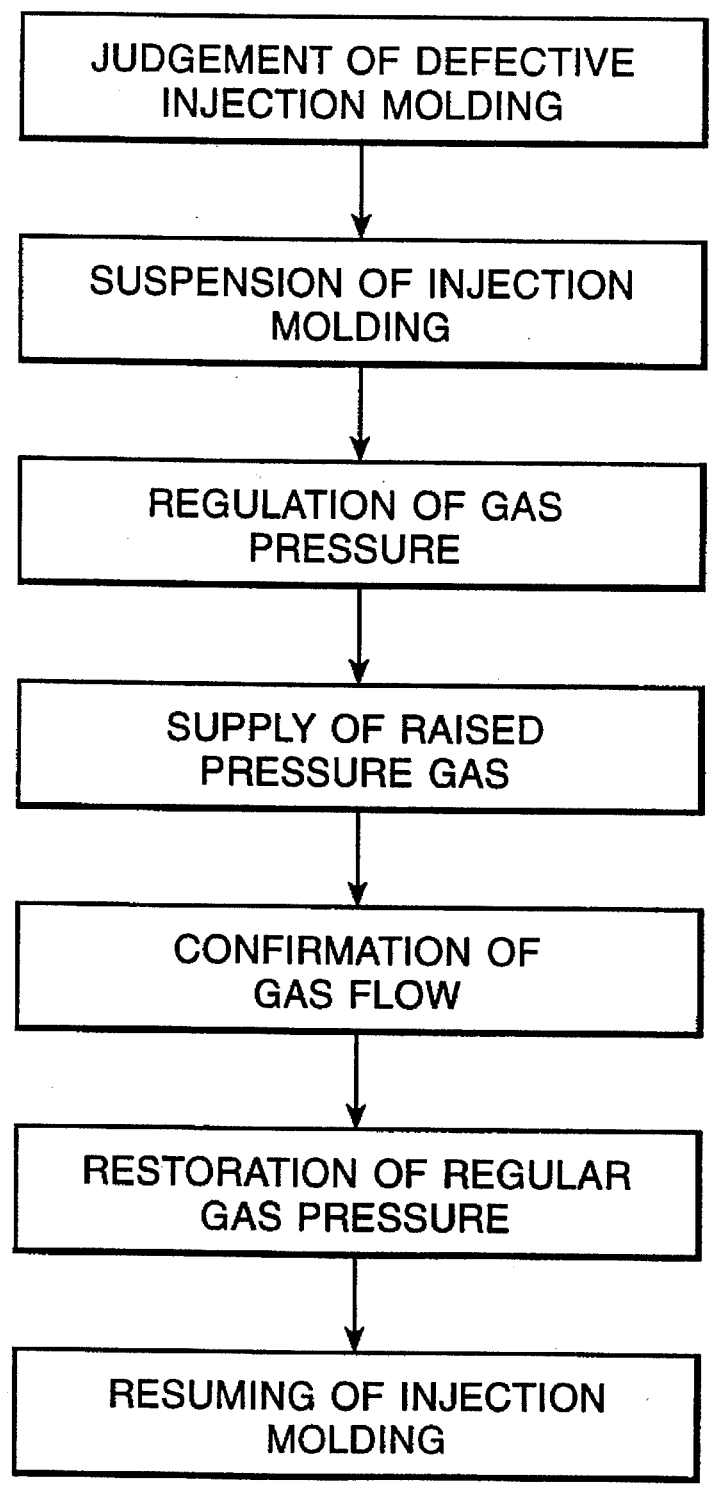
FIG. 5 is a flow chart illustrating a judgement of molding product.

As illustrated by a flow chart shown in FIG. 5, if in fact any one of the gas injection nozzles 5 gives an indication via its sensor 11 that either one or both of its lowest injection temperature Tns and lowest withdrawal temperature Tno has not fallen below the higher injection threshold temperature T1, as shown by a chained line in FIG. 4, this indicates that the pressurized gas has not been injected through the specific gas injection nozzle 5 and, hence, the molded product is defective. Then, the injection molding is suspended for the regulation of gas pressure to be supplied to the specific gas injection nozzle 5, namely, a higher pressure, for instance approximately about 200 kg/cm$^2$. Thereafter, the valve 8 for the specific gas injection nozzle 5 is opened so as to supply the raised higher pressure of gas into only the specific gas injection nozzle 5, thereby blowing out and cleaning the specific gas injection nozzle 5 with the raised pressure of gas. This step is considered essential because the major reason of an insufficient molding pressure is due generally to blockage of the gas injection nozzle 5 with molten resin and the like. After blowing out or cleaning off of the specific gas injection nozzle 5 by having supplied the raised pressure of gas to the specific gas injection nozzle 5 several times, the gas pressure is restored to the regular gas pressure and the injection molding is resumed.

In addition to the determination and comparison of the lowest injection temperature Tns and the lowest withdrawal temperature Tno relative to the higher injection threshold temperature T1, an additional determination and comparison of these lowest temperatures Tns and Tno may be conducted. That is, the lowest injection temperature Tns and the lowest withdrawal temperature Tno are individually compared with a second predetermined lower injection threshold temperature T2 which is established lower than the higher injection threshold temperature T1. If either one or both of the lowest injection temperature Tns and the lowest withdrawal temperature Tno are below the lower injection threshold temperature T2, it is judged that the injection molding has been accomplished under an excessive high gas pressure.

What is claimed is:

1. A method of producing a molded product, having a plurality of internal cavities, from a molten resin material in a molding cavity comprising the steps of:

bringing a plurality of gas injection nozzles into contact with said molten resin material;

injecting an inert gas into the molten resin material in the molding cavity through said plurality of gas injection nozzles so that each of the gas injection nozzles forms one of said internal cavities inside of said molten resin material;

gradually increasing a gas pressure of said inert gas supplied to said plurality of internal cavities through said gas injection nozzles so as to further form said plurality of internal cavities inside of said molten resin material;

removing said gas injection nozzles from said resin material after a predetermined time so that said inert gas is discharged from said plurality of internal cavities;

detecting a temperature of each of said gas injection nozzles;

judging the molded product to be properly produced with a specified quality when each temperature detected is lower than a predetermined temperature;

supplying a pressurized gas through at least one of said gas injection nozzles after removing said at least one of said gas injection nozzles from said resin material when the temperature of the at least one of said gas injection nozzles is higher than said predetermined temperature;

bringing said at least one of said gas injection nozzles again into contact with said resin material in said molding cavity; and injecting inert gas into said resin material so as to form an internal cavity in said resin material.

2. A method of producing a molded product, having a plurality of internal cavities, from a molten resin material in a molding cavity comprising the steps of:

bringing a plurality of gas injection nozzles into contact with said molten resin material;

injecting an inert gas into the molten resin material in the molding cavity through said plurality of gas injection nozzles so that each of the gas injection nozzles forms one of said internal cavities inside of said molten resin material;

gradually increasing a gas pressure of said inert gas supplied to said plurality of internal cavities through said gas injection nozzles so as to further form said plurality of internal cavities inside of said molten resin material;

removing said gas injection nozzles from said resin material after a predetermined time so that said inert gas is discharged from said plurality of internal cavities;

detecting a temperature of each of said gas injection nozzles; and judging the internal cavities of the molded product to be properly produced with a specified quality when each temperature detected is lower than a predetermined temperature;

wherein the temperature of each of the gas injection nozzles is detected while injecting said inert gas.

3. A molding method as defined in claim 2, wherein the temperature of each of the gas injection nozzles is detected at a peak pressure level of said gas pressure.

4. A method as defined in claim 2, wherein the molded product is judged to be properly produced with said specified quality when the temperature of each of the gas injection nozzles is lower than said predetermined temperature and higher than another predetermined but lower temperature.

5. An injection molding method as defined in claim 4, wherein the temperature of each of said gas injection nozzles is detected during injection of said inert gas and during discharge of said inert gas, respectively, and the molded product is judged to be properly produced with the specified quality when said temperature of each of the gas injection nozzles is between said predetermined temperature and said lower temperature.

6. A method of producing a molded product, having a plurality of internal cavities, from a molten resin material in a molding cavity comprising the steps of:

bringing a plurality of gas injection nozzles into contact with said molten resin material;

injecting an inert gas into the molten resin material in the molding cavity through said plurality of gas injection nozzles so that each of the gas injection nozzles forms one of said internal cavities inside of said molten resin material;

gradually increasing a gas pressure of said inert gas supplied to said plurality of internal cavities through said gas injection nozzles so as to further form said plurality of internal cavities inside of said molten resin material;

removing said gas injection nozzles from said resin material after a predetermined time so that said inert gas is discharged from said plurality of internal cavities;

detecting a temperature of each of said gas injection nozzles; and judging the molded product to be properly produced with a specified quality when each temperature detected is lower than a predetermined temperature;

wherein said step of removing said gas injection nozzles includes placing said gas injection nozzles in a path of flow of discharging inert gas and said step of detecting the temperature of each of the gas injection nozzles is performed during discharge of said inert gas.

7. A method of producing a molded product, having a plurality of internal cavities, from a molten resin material in a molding cavity comprising the steps of:

bringing a plurality of gas injection nozzles into contact with said molten resin material;

injecting an inert gas into the molten resin material in the molding cavity through said plurality of gas injection nozzles so that each of the gas injection nozzles forms one of said internal cavities inside of said molten resin material;

gradually increasing a gas pressure of said inert gas supplied to said plurality of internal cavities through said gas injection nozzles so as to further form said plurality of internal cavities inside of said molten resin material;

removing said gas injection nozzles from said resin material after a predetermined time so that said inert gas is discharged from said plurality of internal cavities;

detecting a temperature of each of said gas injection nozzles; and judging the internal cavities of the molded product to be properly produced with a specified quality when each temperature detected is lower than a predetermined temperature;

wherein said step of removing said gas injection nozzles includes placing said gas injection nozzles in a path of flow of discharging inert gas and the temperature of each of the gas injection nozzles is detected after discharging said inert gas.

8. A method of producing a molded product, having a plurality of internal cavities, from a molten resin material in a molding cavity comprising the steps of:

bringing a plurality of gas injection nozzles into contact with said molten resin material;

injecting an inert gas into the molten resin material in the molding cavity through said plurality of gas injection nozzles so that each of the gas injection nozzles forms one of said internal cavities inside of said molten resin material;

gradually increasing a gas pressure of said inert gas supplied to said plurality of internal cavities through said gas injection nozzles so as to further form said plurality of internal cavities inside of said molten resin material;

removing said gas injection nozzles from said resin material after a predetermined time so that said inert gas is discharged from said plurality of internal cavities;

detecting a temperature of each of said gas injection nozzles; and judging the molded product to be properly produced with a specified quality when each temperature detected is lower than a predetermined temperature;

wherein said step of removing said gas injection nozzles includes placing said gas injection nozzles in a path of flow of discharging inert gas and a plurality of temperatures of said gas injection nozzles is detected during injection of said inert gas and during discharge of said inert gas, respectively, and the molded product is judged to be properly produced with the specified quality when the temperatures of the gas injection nozzles are lower than said predetermined temperature.

9. An injection molding method of producing a product, having a plurality of internal cavities, comprising the steps of:

injecting a molten resin material into a mold cavity;

injecting an inert gas into said molten resin material through a gas injection nozzle in contact with said molten resin material;

gradually increasing a gas pressure of said inert gas so that said gas injection nozzle forms one of said internal cavities in said resin material;

holding said inert gas at a predetermined pressure;

detecting a temperature of said gas injection nozzle during injection of said inert gas;

evaluating the product as being properly produced with a specified quality when said temperature of the gas injection nozzle is lower than a predetermined temperature;

removing said gas injection nozzle from said resin material and cleaning said gas injection nozzle when said product is not evaluated as being properly produced; and bringing said gas injection nozzle again into contact with said resin material and again injecting an inert gas at a gradually increasing gas pressured into said resin material through said gas injection nozzle.

10. An injection molding method as defined in claim 9, and further comprising the steps of detecting a temperature of said gas injection nozzle during discharge of said inert gas, and evaluating the product as being properly produced with a specified quality when said temperature of the gas injection nozzle is lower than said predetermined temperature and higher than another predetermined temperature lower than said predetermined temperature.

* * * * *